UNITED STATES PATENT OFFICE.

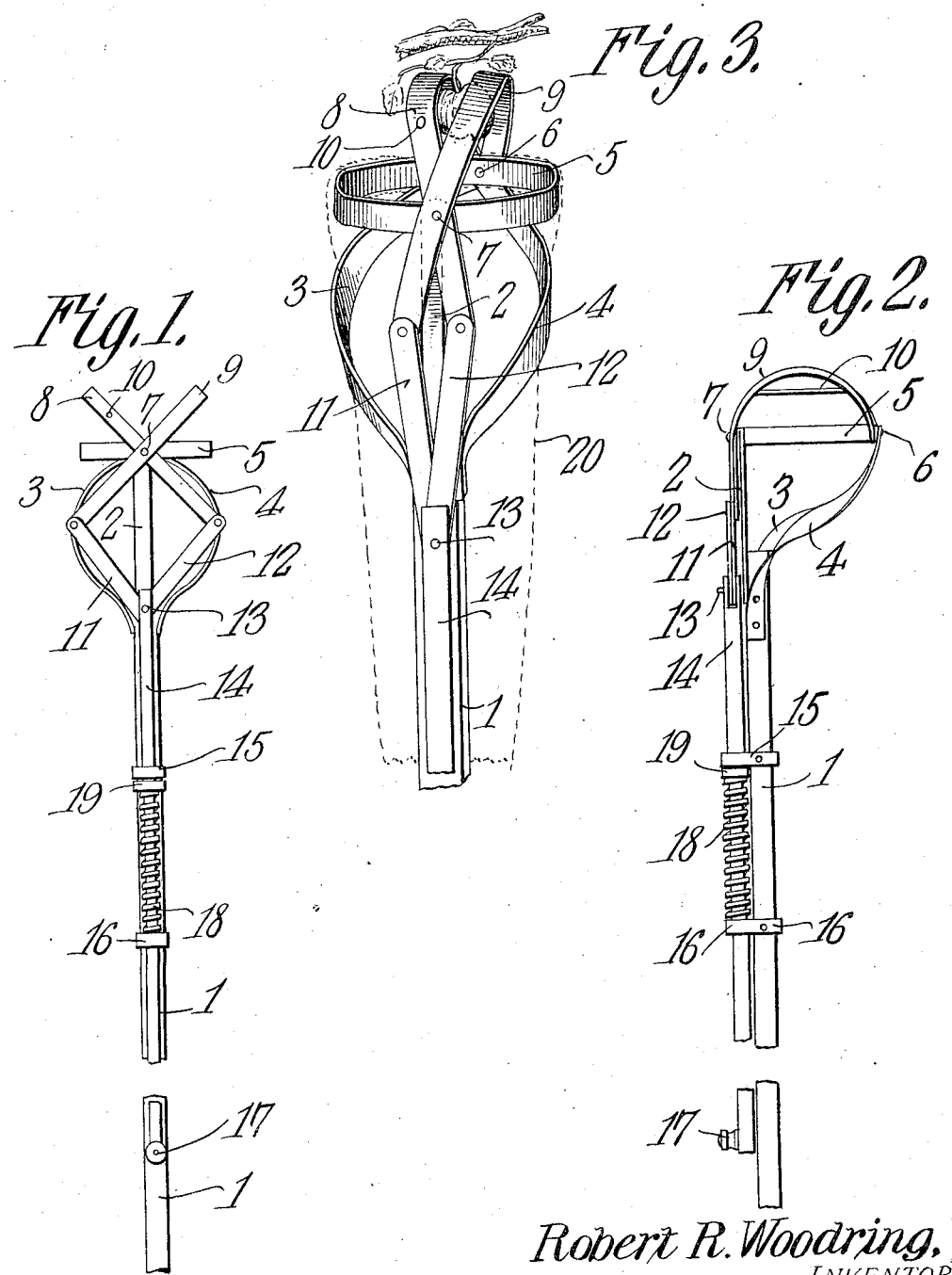

ROBERT R. WOODRING, OF CARROLL, IOWA.

FRUIT-PICKER.

No. 862,227.        Specification of Letters Patent.        Patented Aug. 6, 1907.

Application filed April 8, 1907. Serial No. 367,042.

*To all whom it may concern:*

Be it known that I, ROBERT R. WOODRING, a citizen of the United States, residing at Carroll, in the county of Carroll and State of Iowa, have invented a new and useful Fruit-Picker, of which the following is a specification.

My present invention relates to improvements in devices for picking fruit, and it has for its object to provide an improved device of this character that may be easily operated from the ground or other distant point and insures the delivery of the fruit without liability of injuring it, the improved construction of the fruit severing or detaching devices serving to effectually disengage the fruit from the limb without marring it, and the flexible conductor insuring the safe descent of the fruit after being disengaged.

To these and other ends, the invention comprises the various novel features of construction, and combination and arrangement of parts, which will be more fully described hereinafter and set forth particularly in the claims appended hereto.

In the accompanying drawing:—Figure 1 is a view in elevation of a fruit picker constructed in accordance with the present invention, the severing blades being shown in open position. Fig. 2 is a view of the device shown in Fig. 1, as viewed from the right. Fig. 3 is a perspective view of the upper portion of the device showing the mode of operation of the blades.

Corresponding parts in the several figures are indicated throughout by similar characters of reference.

The device shown in the present embodiment of my invention comprises a rod or staff 1 that may be made of different lengths to be determined according to the class of fruit or the height of the trees with which the device is to be used. Extending upwardly from the upper end of the staff is a vertical bearing arm 2, and from the two adjacent sides of the staff extend a pair of brace arms 3 and 4, the upper ends of the latter and the vertical bearing arm being attached at diametrically opposite points to a circular frame 5 that is arranged in a plane substantially perpendicular to the direction of the staff, the connections employed in the present instance embodying pins 6 and 7 which serve also as pivots for the severing blades 8 and 9, the latter being substantially semi-circular in shape and arranged to fold one above the other when they are closed, one of the blades, preferably the lower blade 8, being provided with a cross bar 10 arranged thereon at a point between its upper periphery and the pivots and adapted to engage one side of the article or fruit and deflect it beneath the proximate edge of the blade 9 which engages the stem thereof, the deflection of the fruit being sufficient to break the stem if the fruit is ripe so that the fruit will be taken from the tree in a manner similar to that of can picking, the stems being broken a sufficient distance from the fruit to leave the latter with a relatively long stem. Should the stem fail to break on account of the bending, as may happen if the fruit is not fully ripe, the blades in closing will operate as shears to sever the stem.

The ends of the blades at one side of the frame are prolonged beyond their pivots to form operating portions, the extremities of these portions being pivotally attached to the upper ends of a pair of links 11 and 12, the latter being pivotally attached by means of the pivot 13 to an actuating bar 14, the latter being guided by means of bearings 15 and 16, so as to operate longitudinally of the staff, a handle 17 being arranged on the actuating bar at a point in proximity to the lower end of the staff so that the latter may be held by one hand of the operator and the handle of the actuating bar may be manipulated by the other hand of the operator.

A relative upward movement of the actuating bar will spread the upper ends of the links 11 and 12, operating to open the severing blades, and in order to normally retain the blades in open position to admit the fruit between them, it is preferable to employ a spring 18 of helical form encircling the actuating bar at a point between its bearings 15 and 16, one end of the spring abutting against the bearing 16 while its upper end presses against a stop collar 19 rigidly attached to the actuating bar, the latter engaging the upper bearing 15, if so desired, in order to limit the opening movement of the blades.

Attached to the circular frame 5 and depending therefrom is a tubular conductor 20 that is preferably composed of a relatively soft flexible material, such as cloth or other fabric, that will not injure the fruit in passing therethrough, the upper portion of the conductor extending between the brace arms 3 and 4 that are bowed outwardly in order to accommodate it, the lower end of the conductor terminating at a point in proximity to the lower end of the staff so that the fruit descending therethrough may be caught either by hand or directed to a suitable receptacle.

In picking fruit with a fruit picker constructed in accordance with the present invention, the appliance is manipulated from the ground or other suitable means of support, the upper end of the appliance being so placed that the article of fruit rests beneath the coöperating blades, the stem passing between their proximate edges, and after the fruit has been thus introduced, the actuating bar 14 is drawn downwardly by means of the handle 17, the upper ends of the links 11 and 12 cooperating with the prolonged operating portions of the blades to turn the latter about their pivots, and as the upper portions of the blades move toward one another, the cross bar 10 will engage the fruit at one side and deflect it laterally, the stem of the fruit being at the same time engaged by the inner edge of the opposing blade, the stem of the fruit being thus severed, the article of fruit entering the annular frame 5 and extending through the conductor to the desired point of delivery.

A fruit picker constructed in accordance with the present invention is relatively light in weight, so that it may be readily manipulated, and that form shown in the present instance is composed largely of sheet metal parts that may be punched and formed by machinery, so that the cost of the device is relatively small, and as the opening movement of the blades is accomplished automatically, the device may be operated with the greatest facility.

What is claimed is:—

1. A fruit picker embodying a staff, substantially semi-circular blades having their ends pivoted on an axis arranged transverse to the staff, a fruit engaging device arranged on the under side of one of the blades for deflecting the fruit to bend its stem while the latter engages one of the blades, and means for operating the blades.

2. A fruit picker embodying a suitable staff, a pair of coöperatively arranged severing blades pivoted at one end of the staff, one of the blades being provided with a cross bar arranged below it to coöperate with the side of the fruit as the blades are proximated, the other blade serving to engage the stem and break it.

3. A fruit picker embodying a suitable staff having a bearing arm extending longitudinally thereof and a pair of brace arms extending obliquely to the bearing arm, the upper ends of the bearing and brace arms being provided with pivot pins, and a conductor passing between the said brace arms, of a pair of coöperatively arranged severing blades mounted to turn on said pivot pins and having their ends prolonged beyond one of the pins to form operating portions, links coöperating with the end of the operating portions, and an actuating bar guided to reciprocate longitudinally of the staff and operatively connected with the links for actuating them.

4. A fruit picker embodying a suitable staff having a vertical bearing arm arranged on one end thereof and a pair of brace arms extending obliquely to the bearing arm and bowed outwardly, the upper ends of the brace arms and bearing arm being provided with pivot pins, a circular frame connected to the pivot pins of the brace and bearing arms at opposite points of the frame, a flexible conductor having its upper end open and supported by the circular frame and extending downwardly between the outwardly bowed brace arms, a pair of semi-circular severing blades mounted above the frame and arranged to turn on the pivot pins, and suitable means for actuating the blades.

5. A fruit picker embodying a staff having a pair of guides suitably spaced longitudinally thereon, a bearing arm arranged substantially in alinement with said guides, and brace arms having their upper ends offset laterally of the bearing arm, a pair of coöperatively arranged severing blades mounted at the upper ends of the bearing and brace arms, an actuating bar extending through said guides and operatively connected to the severing blades at the sides thereof adjacent to said bearing arm for opening and closing the blades by a longitudinal movement of the bar relatively to the stem, and a helical spring encircling the bar between the guides and having one end engaging one of the guides and its other end operatively connected to the actuating bar.

In testimony that I claim the foregoing as my own, I have hereto affixed my signature in the presence of two witnesses.

ROBERT R. WOODRING.

Witnesses:
GEO. J. HESS,
W. B. BROWN.